United States Patent [19]

[11] 3,755,818

Greenspan

[45] Aug. 28, 1973

[54] APPARATUS FOR AUTOMATICALLY SYNCHRONIZING THE OPERATION OF A DEVICE TO CORRESPOND WITH ITS MOVEMENT ALONG A PREDETERMINED ROUTE

[75] Inventor: Myron Greenspan, Brooklyn, N.Y.

[73] Assignee: Patented Technology Company, Brooklyn, N.Y.

[22] Filed: Feb. 9, 1971

[21] Appl. No.: 113,968

[52] U.S. Cl..... 343/228, 179/100.1 C, 179/100.2 S, 325/311

[51] Int. Cl. .............................................. H04b 7/00

[58] Field of Search.................... 343/225, 228, 226; 179/100.1 C, 100.1 VC, 100.25, 82; 340/309.1, 309.4; 35/35 C, 8 A; 325/311

[56] References Cited

UNITED STATES PATENTS

| | | | |
|---|---|---|---|
| 2,965,720 | 12/1960 | Bumstead et al. | 38/8 A |
| 3,027,425 | 3/1962 | Tannebaum et al. | 179/100.2 Z |
| 3,581,283 | 3/1971 | Reddel et al. | 340/171 |
| 2,991,448 | 4/1961 | Diamond et al. | 340/21 X |
| 3,122,847 | 3/1964 | Redfield et al. | 35/8 A |
| 3,078,348 | 2/1963 | McIntosh | 35/35 C |
| 3,315,375 | 4/1967 | Heinz | 35/60 X |
| 2,567,431 | 9/1951 | Halstead | 35/35 C |
| 2,787,669 | 4/1957 | Flan et al. | 179/100.2 S |
| 3,530,472 | 9/1970 | Fukata et al. | 343/228 |
| 3,469,152 | 9/1969 | Bosman | 317/148.5 R |
| 2,552,788 | 5/1951 | Hoover | 179/100.1 C |
| 3,001,066 | 9/1961 | Naber et al. | 343/228 |
| 3,509,549 | 4/1970 | Yoshiko Ohta et al. | 179/100.2 S |

*Primary Examiner*—John W. Caldwell
*Assistant Examiner*—William M. Wannisky

[57] ABSTRACT

The operation of the a tape recorder is automatically controlled so that particular descriptive passages are played at appropriate locations along a predetermined route. By this means, synchronization is obtained between the particular passages played and the location of the recorder along the route so that each descriptive passage on a tape is played at a time when the recorder is approaching the point along the route described in the passage. Radio-control is used to trigger the recorder "on" while pre-recorded tone signals are placed on the tape at the end of individual passages to turn the recorder "off."

11 Claims, 3 Drawing Figures

PATENTED AUG 28 1973 3,755,818

INVENTOR.
MYRON GREENSPAN

APPARATUS FOR AUTOMATICALLY SYNCHRONIZING THE OPERATION OF A DEVICE TO CORRESPOND WITH ITS MOVEMENT ALONG A PREDETERMINED ROUTE

BACKGROUND OF THE INVENTION

This invention relates to tape recorders and more particularly it concerns an apparatus for automatically controlling and synchronizing the operation of a tape recorder to correspond to its movement along a predetermined route.

Operation of tape recorders has, in the past, been performed manually. Thus, most recorders have a "play" or "on" control which activates the machine and causes recorded audio signals to be picked up from a tape, amplifies these signals and transforms these signals into audible form by means of a loud speaker. When an operator wishes to stop the recorder, he can do so by means of a "stop" control on most machines. This stop control usually turns off the power to the machine.

Tape recorders, and in particular, cassette recorders, have recently been used in conjunction with guided tours. These tours consist of utilizing a cassette recorder together with a specially recorded tape for this purpose. These tapes contain descriptive portions which aid the user in his tour. The tourist is usually instructed that, at the end of a particular descriptive portion, he will hear an audible tone. At such time, he is told, he must stop his machine, manually as described above, and turn the recorder back on when he reaches a predetermined, "turn-on", location. Upon reaching such location, the tourist turns his machine on again, listens to the descriptive portion until he again hears the tone and, as before, turns his machine off until he reaches the next place to be described. This process continues until the tour is completed.

By using this approach, an attempt has been made to synchronize the physical location of the tourist with the appropriate description on the tape and with the point of interest which is being described. This, of course, has been done to give the tourist the optimum enjoyment from his tour. However, this scheme has had its drawbacks. First, the tourist is burdened with having to turn the recorder on at the appropriate predetermined places. This has been a problem since the tourist is usually not familiar with the various locations alluded to as "turn-on" points. Thus, the tourist must concentrate on determining where these "turn-on" points are and manually turn on the machine at those points. It is therefore possible that he may turn the machine on before or after he reaches the appropriate point of interest. In either case, the above described effort for synchronization has been fruitless. Second, manual operation is inconvenient, especially in connection with driving tours on tape where the tourist is also a driver.

SUMMARY OF THE INVENTION

According to the broader aspects of the present invention, means are provided for automatically turning a machine "on" at an appropriate "turn-on" point. Furthermore, at the completion of predetermined operations of the machine, means are provided for turning the machine "off" and resetting it for turning "on" at a next "turn-on" point.

As applied to a tape recorder used on a tour route, the present invention consists of a plurality of transmitters situated at the various "turn-on" points along the predetermined route which transmit triggering signals. A receiver, associated with a recorder used on a tour, is adapted to receive these triggering signals. The nature of the triggering signals can vary to suit particular conditions. Thus, the transmitted signals can be coded in any of a plurality of ways to prevent false triggering by interfering signals. After receiving the signal, the receiver, may decode and, detects the signal, and a detected voltage is made available at the output of the receiver which can be used to close a relay or otherwise turn on a control circuit.

The detected voltage from the receiver is used to activate a latching relay. This relay, when closed, applies power to the recorder, which turns it on. A descriptive portion on a tape is then played describing a particular point of interest. At the end of each passage, recorded tone signals are provided on the tape. When a passage has terminated, the recorded tone is played and detected in a similar fashion as the triggering signals. However, the recorded tones need not generally be coded since interfering signals are not present, as during transmission through the atmosphere. A voltage is generated by a recorded tone signal detector which releases the latching relay and thereby removes the power to the recorder and turns it off.

Means are provided, in connection with this embodiment for insuring reliable synchronization under varying conditions. Thus, once the receiver has received a triggering signal and the appropriate narrative passage has played, it is necessary that the passage describing the next point of interest is not triggered on by the same transmitter. This may happen in cases where the traveler is halted in traffic adjacent to a transmitter which is thereby continuously transmitting triggering signals. With the present invention, once a descriptive passage is triggered on by an appropriate receiver, the receiver cannot activate the recorder after a recorded "stop" signal unless the receiver has moved away sufficiently from the initial transmitter so as no longer to receive its signals. Thus, only after the receiver stops receiving signals can it be effective to turn the recorder on once again, this time by a subsequent transmitter along the tour route.

There has been outlined the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other devices for carrying out the several purposes of the invention. It is important, therefore, that the claims be regarded as including such equivalent designs as do not depart from the spirit and scope of the invention.

A specific embodiment of the invention has been chosen for purposes of illustration and description, and is shown in the accompanying drawings, forming a part of the specification, wherein:

DETAILED DESCRIPTION OF THE PREFERRED EMBODIMENTS

Figure 1:
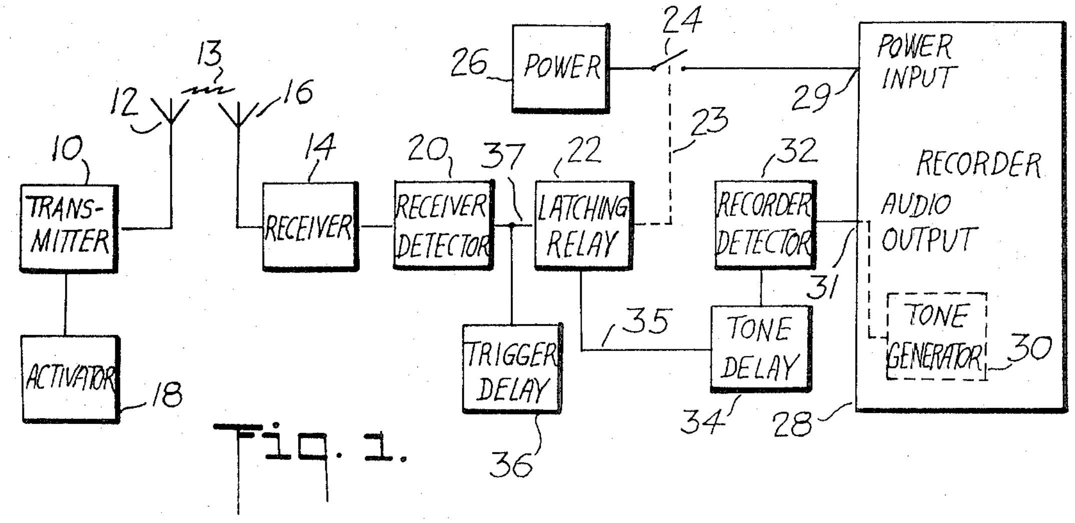
FIG. 1 is a block diagram of a preferred embodiment of the invention.

For the purpose of describing the elements of the present invention, I have chosen to describe the invention in connection with reproduction means in the form of a tape recorder. Thus, FIG. 1 shows a recorder 28 whose operation is desired to be either fully or semi-automatic. The reproducing means or recorder 28 has a power input jack or terminal or other external power control means 29 and an audio output jack 31. Most commerically available recorders have such an external power input and an audio output jack, commonly adapted for priviate earphone listening.

As contemplated, with this present embodiment, a transmitter 10 is situated along a road. Activator 18 keyes transmitter 10 on only under certain conditions. Thus, a switch across the road or a metal detector (not shown) may be used to key the transmitter on only at times when a vehicle passes the transmitter on the road. The purpose of keying transmitter 10 is to comply with FCC rules and regulations controlling low power devices. Antenna 12, associated with transmitter 10, needs only radiate a signal 13 of sufficient power to cover a radius of several hundred feet. The intensity levels transmitted must not exceed those set out by the FCC. However, if the transmitter is keyed as described above, and the transmitter qualifies as a garage-door opener, the permissible power levels and frequencies are more than adequate to utilize the present invention in most applications. However, if it becomes desirable to turn on a recorder, for example, more than several hundred feet prior to reaching the transmitter, it may be necessary to utilize more powerful transmitters. Again, subject to compliance with the FCC rules and regulations, and appropriate licensing of the transmitters, it is possible to transmit several watts of radio-control power (Citizen Band Class C Stations, for example). Garage-door operation, as described above, does not require FCC licensing if the transmitters are properly certified.

Receiver 14, and antenna 16 associated with the receiver, is designed to receive the signals transmitted by transmitter 10. The frequency of operation and method of coding is not critical for accomplishing the several purposes of the present invention and may consist of distinct tones or precise pulse sequences. Subject to compliance with FCC regulations, any transmitter-receiver combination, can be used. Recent garage-door opener models, for example, are particularly attractive where low power devices can be used because they are solid state and operate at UHF frequencies. Operation at these higher frequencies has made possible use of simpler and shorter antennas. Where more power must be transmitted, operation in citizens band or other services may be required.

Generally, transmitter 10 can simply consist of a UHF oscillator which is modulated at an audio frequency or is pulse modulated. Receiver 14, for this application, can simply consist of a superregenerative detector. The advantage of such a receiver is that it is highly sensitive and relatively simple in design. It can be used, as in this application, where the quality of reproduction is not critical. Because the art dealing with such receivers and transmitters is old and fully described in various textbooks, no further detail will be set forth in this application. The subject is explored in "Radio Electronics" by Samuel Seely, McGraw Hill Book Company, Inc. 1956 and "Electronic Designers' Handbook" by Robert W. Landee, et. al., McGraw Hill Book Company, Inc. 1957.

Receiver detector 20, which may or may not be incorporated into receiver 14, can be a diode integrating detector of the peak or averaging variety. The purpose of detector 20 is to rectify a low frequency signal, carried by signal 13, to produce a d-c voltage. Thus, whenever receiver 14 receives and amplifies a signal 13, the output of the receiver is detected by detector 20 and a d-c voltage appears at the detector output.

A latching relay 22 is provided which has an activating input 37, a deactivating input 35 and a switch 24 having two contacts, which is controlled by coupling 23. The output of receiver detector 20 is coupled to the activating input 37 of latching relay 22. A source of power 26 is provided which is connected to one of the contacts of switch 24. The other contact of switch 24 is connected to power input jack or terminal 29 so that closing of switch 24 applies power to the reproducing means or the recorder 28 while opening of switch 24 removes power to recorder 28.

Figure 3:
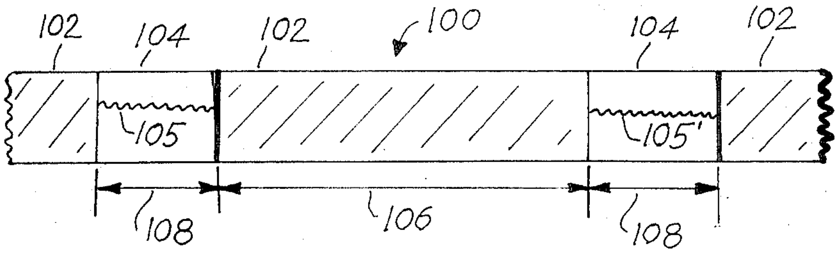
FIG. 3 illustrates pictorially the layout on a recording tape used in conjunction with the preferred embodiment shown in FIG. 1

A tone generator 30, to be more fully described in connection with FIG. 3, is provided for generating tones under certain conditions. The tones thus generated are coupled to the audio output jack 31. The tones produced, of a low frequency type similar to the frequencies modulating carrier signal 13, are detected by recorder detector 32. Detector 32, similarly as receiver detector 20, produces a d-c voltage at its output whenever a tone signal is generated. The growth of the amplitude of the d-c voltage generated by detector 32 is retarded by tone delay 34, for purposes to be described later. The peak d-c voltage on the output of detector 32, appears, after a small delay, at the deactivating input 35 of latching relay 22.

Desensitizing means in the form of a trigger delay 36 is provided at the output of receiver detector 20 to monitor the presence of a voltage at the output of detector 20. Since reception of an appropriate signal 13 will produce a voltage at the output of detector 20, trigger delay 36 is connected to said output in parallel with latching relay input 37. The purpose of trigger delay 36 is to cause the voltage at the receiver detector 20 to decay after an initial high buildup. The effect desired is a decrease in the influence of a particular transmitter, after its initial reception, at the activating relay input 37.

The operation of the apparatus is as follows. An automobile (not shown) approaches a transmitter 10 on a road along a predetermined tour route. The transmitter is located at a point just prior to a point of interest to be described by recorder 28. Activator 18 senses the presence of an automobile and keys transmitter 10 to transmit a triggerring signal 13. Transmission can be conducted either during the time that the automobile is in the proximate vicinity of activator 18 or for a fixed period of time after initial transmission. During such time, transmitter 10 transmits a triggering signal 13 via antenna 12.

The balance of the circuitry shown in FIG. 1, everything shown to the right of antenna 16 in FIG. 1, is located inside the passing automobile. Antenna 16, picks up signal 13 and feeds it to receiver 14. Receiver 14 amplifies and, if the signal is coded, processes signal 13. The decoded or modulation signal is detected by receiver detector 20, which produces a d-c voltage at its output. The initial presence of the d-c voltage at the output of the detector 20, which is connected to the activating input 37 of latching relay 22, activates latching relay 22. Activation of latching relay 22 causes coupling 23 to close switch 24. This causes power source 26 to be applied to recorder 28, which turns on recorder 28 and causes recorder 28 to play an appropriate pre-recorded passage describing the point of interest just following the transmitter 10.

At the conclusion of the pre-recorded description of the particular point of interest, a tone generator 30 produces a tone. In the preferred embodiment, tone signals can be prerecorded at the ends of the descriptive passages. Thus, the tone generator 30 includes the prerecorded tones on the tape used in conjunction with the tour and the tape or cassette recorder equipment. The pre-recorded tones are reproduced in the same way as the audio signals comprising the descriptive passages. The signals picked up from the tape, including the tone signals, are coupled to audio output jack 31.

A recorder detector 32 detects the presence of an audio tone at the audio output jack 31 and produces a d-c voltage at its output. The appearance of a d-c voltage, of appropriate amplitude at de-activating relay input 35, subject to a delay caused by tone delay 34, de-activates latching relay 22. When such a voltage is applied to input 35, coupling 23 causes switch 24 to open, thereby disconnecting power source 26 from recorder 28 and thereby terminating its operation.

Having passed a site described on the recorder, the apparatus is again receptive to a subsequent transmitter (not shown), similar to transmitter 10, along the tour route signalling a further point of interest to be described by a passage on the tape. This triggering of the device by transmitters along the entire tour route, the playing of appropriate passages describing points of interest which follow the transmitters and the automatic termination of recorder operation at the end of each descriptive passage continues until the entire tour route has been traversed and all the points of interest have been described.

If initial transmission and reception is thought of as being a first event and the initial reproduction by recorder 28 of a tone as being a second event, then recorder 28 is on for durations of time extending from the occurrences of first events until occurrences of second events. This of course, also corresponds to the lengths of time required for the individual descriptive passages.

The primary purpose of the desensitizing means or trigger delay 36 is to prevent any one particular transmitter from causing more than one descriptive passage to be played. Thus, initial buildup of voltage at the output of detector 20 provides sufficient voltage amplitude at relay activating input 37 to activate latching relay 22. However, after a short time has elapsed subsequent to initial reception and upon continued reception, trigger delay 36 causes the voltage at the output of detector 20 to be loaded down and thereby reduced in amplitude. By sufficiently reducing the voltage amplitude at the output of detector 20, this voltage is not sufficient to activate latching relay 22. Until reception of signals 13 is interrupted, as by moving beyond the range of a particular transmitter 10, trigger delay 36 maintains the detector 20 voltage output at the low level. Once signal 13 reception is interrupted, the voltage at the output of detector 20 becomes zero and the trigger delay 36 becomes de-activated. Upon renewed reception, as may be caused by a subsequent transmitter, the voltage at the output of detector 20 is once again permitted to grow to a substantially large voltage, enough to activate latching relay 22. Only after continuous reception, for a time determined by the delay of trigger delay 36, does delay 36 become activated and loads down detector 20 as described above. Thus, as long as a tourist continuously progresses along a tour route in a predetermined manner designed to pass appropriate transmitters successively, trigger delay means 36 insures that when recorder 28 is turned on, it is by the proper transmitter and not by the same transmitter more than one time.

Tone delay means 34 serves to prevent abnormally short tone signals from de-activating latching relay 22. Thus, the pre-recorded tone signals have fixed time intervals on the tape. When a descriptive passage has terminated, the appearance of a pre-recorded tone signal will be effective, as described above, to de-activate latching relay 22. However, if the de-activation of relay 22 has caused recorder 28 to stop operation prior to the end of a tone interval, a subsequent reception which would have the tendency to cause the recorder 28 to be turned on, may not be effective to turn recorder 28 on since the balance of the tone signal interval may turn the recorder 28 off as soon as it is turned on. Tone delay means 34 retards the growth of voltage amplitude at at de-activating input 35 of relay 22. The time constant of delay means 34 is chosen so that more than one half of the tone signal interval is required before the voltage at the output of delay means 34 can build up sufficiently to enable it to de-activate relay 22. Thus, whenever more than one half of a tone interval is used to stop recorder 28, less than one half the interval remains when reception commences. This is not sufficient to turn the recorder 28 off and the recorder continues to play until a subsequent whole interval appears.

Figure 2:
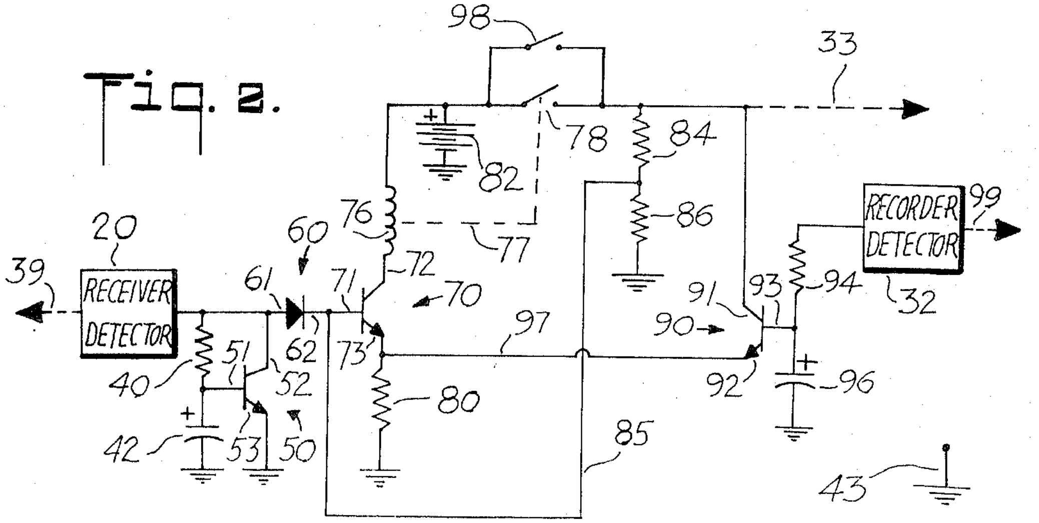
FIG. 2 is a fragmentary view showing schematically the circuits used to realize several of the blocks shown in FIG. 1

In FIG. 2, line 39 represents a connection between receiver 14 and detector 20 in FIG. 1. The output of detector 20 is connected to the cathode 61 of diode 60. The anode 62 of diode 60 is connected to base 71 of NPN transistor 70. Emitter 73 is connected to reference point 43 through resistor 80. Relay coil 76 is connected between the positive terminal of power source 82 and collector 72. When a received signal is detected and a positive d-c voltage appears at the output of detector 20, this forward biases diode 60 and causes it to conduct. The appearance of a positive voltage, in relation to reference point 43, at base 71 forward biases the junction between base 71 and emitter 73 and causes current to flow from power source 82, through relay coil 76, collector 72, emitter 73 and resistor 80 to reference point 43. Current flow through relay coil 76 sets up electromagnetic coupling field 77 which closes switch 78. Closing switch 78 applies the voltage of power source 82 to line 33 which goes to the power input jack 29 of FIG. 1 and turns recorder 28 on. The closing of switch 78 also causes the voltage of the power source 82 to appear across a voltage divider consisting of series resistors 84 and 86 between line 33 and reference point 43. A line 85 connects the common point between resistors 84 and 86 to base 71. This applies a part of the power source voltage 82 to the base 71 the moment that switch 78 closes, and this supplies forward bias to transistor 70 to keep it conducting, although reception may cease and therefore detector 20 output voltage may become zero. This latching effect maintains power to recorder 28 once transistor 70 is turned on by an initial reception. The purpose of diode 60 is to prevent excessive loading of the divider network when detector 20 output voltage is very low. Such excessive loading would prevent efficient latching of relay switch 78. By inserting diode 60 as shown in FIG. 2, the latching voltage on line 85 back biases diode 60 when detector voltage is low and this effectively presents a very high impedance into the anode 62, minimizing the loading effect on divider resistors 84 and 86.

As stated above, turning on the recorder 28 as a result of an initial reception represents a first event. A descriptive passage is then played. At the conclusion of the passage, a tone signal is generated by recorder 28. Line 99 in FIG. 2 represents the connection to the audio output jack 31 shown in FIG. 1. The initial presence of an entire tone interval represents a second event. When a tone appears on line 99, it is detected by detector 32 which produces a positive d-c voltage with respect to reference point 43 at its output. The detector output voltage is placed across a resistor 94 connected in series with capacitor 96 to the reference point 43. The base 93 of NPN transistor 90 is connected to the common point between resistor 94 and capacitor 96. Emmitter 92 is connected, by means of line 97, to emitter 73 of transistor 70. The time constant associated with resistor 94 and capacitor 96 is selected to charge capacitor 96 sufficiently after one half a signal tone interval to cause transistor 90 to be turned on and cause a current to flow from line 33 through transistor 90 and resistor 80 to reference point 43 to turn transistor 70 off. Since the voltage of the emitter 92 follows the voltage of the base 93, charging capacitor 96 to a large enough voltage causes a voltage at emitter 73 to exceed the latching voltage on base 71. This excess of voltage on emitter 73 relative to the voltage on base 71, reverse biases transistor 70 and turns it off. Turning off transistor 70 causes the current in relay coil 76 to stop flowing and switch 78 opens, removing the power source 82 from recorder 28. This stops recorder 28 operation. Resistor 80 is a current limiting resistor to protect transistor 90 from excessive currents and, therefore, possible destruction.

Resistor 40, capacitor 42 and transistor 50 represents the equivalent of the trigger delay circuit 36 shown in FIG. 1. The circuit, on initial reception and generation of a d-c voltage at detector 20 output, has no effect. This permits a substantial voltage to turn on transistor 70 as described above. However, should a d-c voltage appear at the output of detector 20 for any extended period of time, capacitor 42 will ultimately charge, through resistor 40, sufficiently to saturate transistor 50. Thus, the voltage at base 51 increases sufficiently to cause a large current to flow from the detector 20 output through collector 52 and emitter 53 to reference point 43. The collector 52-emitter 53 voltage, during saturation decreases substantially. It will be noted that the cathode 61 voltage will remain at a low level so long as reception continues. As soon as reception is interrupted, capacitor 42 discharges. This opens transistor 50 and again permits a high level voltage to be generated at cathode 61, for an interval of time determined by resistor 40 and capacitor 42, on a subsequent reception and development of a d-c voltage at the output of detector 20.

It is necessary to select, for the embodiment shown in FIG. 2, appropriate voltage levels and time constants for flawless operation. Thus, in FIG. 2, transistor 70 is the primary control element. Transistor 70, together with relay 76, 77, 78 and divider 84, 86 comprise latching relay 22 in FIG. 1. By applying voltages of differing voltage amplitudes, properly timed, the state of transistor 70 is controlled whereby control is had over power flow to line 33. The initial voltage applied to base 71, on the occurrence of a first event, by detector 20 through diode 60 must be large enough to turn transistor 70 on hard enough — so as to cause enough current to flow in collector 72 and coil 76 to close switch 78. Divider resistor 84 and 86 are chosen so that a voltage of comparable magnitude to that initially applied to base 71 is fed back via line 85 to keep transistor 70 turned on, although reception may cease and, therefore, detector 20 output voltage may go to zero. In any event, should reception continue for an extended period of time, transistor 50, resistor 40 and capacitor 42 will cause the voltage at the cathode 61 to drop, as described above, to a level too small to turn transistor on under any condition. Only turning transistor 50 off, as by interruption in reception, could transistor be turned on again by the output of detector 20.

Once transistor 70 is latched on feedback voltage on line 85, transistor 70 could remain in the on state indefinitely. On the occurrence of a long enough tone interval, however, sufficient voltage is developed on emmitters 92 and 73 to turn transistor 70 off. As described above, switch 78 then opens and the recorder 28 turns off. It is important that the voltage on line 97 is permitted to grow to a voltage substantially above the latching voltage on line 85 since it is necessary to reverse bias transistor 70 to turn it off. However, since the deactivating voltage on line 97 grows exponentially, the time constant associated with resistor 94 and capacitor 96 is chosen so that the voltage on line 97 does not become large enough to overcome the latching voltage on line 85 except when more than one half a tone interval has been produced. In this way, should less than one half a tone interval remain unplayed on the tape when the recorder is turned on at the occurrence of a first event, the shorter than required tone interval plays and concludes without being effective to develop sufficient de-activating voltage on line 97 to turn transistor 70 off. After the very short tone is played, the recorder continues to play the descriptive passage until a subsequent whole tone interval appears. Now, of course, since the tone is of sufficient length, it is effective to turn transistor 70 off. Thus, it is seen that the use of a tone delay, such as transitor 90, resistor 94 and capacitor 96, allows the playing of the tail ends of tone intervals without affecting the effective turning off of recorder 28. A second event can be thought of as the occurrence of more than one half of a tone interval and only second events are affective to turn the machine off.

While many circuit parameters may be chosen in the realization of the preferred embodiment described above, the following values have been found satisfactory:

| ELEMENT | IDENTIFICATION | VALUE/TYPE |
|---|---|---|
| 40 | Resistor | 1K ohms |
| 42 | Capacitor | 275 microfarads |
| 80 | Resistor | 56 ohms |
| 84 | Resistor | 10K ohms |
| 86 | Resistor | 4.7K ohms |
| 94 | Resistor | 22K ohms |
| 96 | Capacitor | 140 microfarads |
| 50 | Transistor | 2 N708 |
| 60 | Diode | 1 N625 |
| 70 | Transistor | 2 N444A |
| 76–78 | Relay | Elgin MV2C-120D-15 |
| 82 | Battery | 12 Volts |
| 90 | Transistor | RCA 40232 |

Switch 98 in FIG. 2 can be connected in parallel to switch 78 to permit semi-automatic operation. Here no reception must take place. Closing switch 98, even temporarily, latches transistor 70 on and the recorder 28 plays until a tone appears on the tape as described above. Of course, permanently closing switch 98 causes recorder 28 to be on continuously with the resultant loss of all automatic operation.

Message carrier means in the form of the tape 100 shown in FIG. 3 illustrates how a tour tape 100 used in conjunction with the present invention may be recorded. Thus, portions or areas 102 represent descriptive passages narrating the essential details about the points of interest. Naturally, each portion or strip 102 may be of a different length 106 since more or less may have to be stated about any particular site. Also, for proper synchronization, as described above, each strip 102 should be associated with a particular transmitter on the tour route so that a transmitter just prior to the location of the point of interest triggers the recorder to play that passage describing that very point of interest.

At the end of each portion or section 102, stop means in the form of pre-recorded signals 105, 105', etc., appear on a strip 104. The length of each strip 104 is 108 and this length is fixed so that all portions or strips 104 are equal in length. As used in conjunction with the embodiment described above, each signal 105, 105', etc., is identical and consists of a tone. The time it takes to play strips 104 is equal to the tone interval described above. Only in cases where more than half a tone interval is played does this means become effective to turn the machine off. This guarantees that each strip 104 is effective to turn the machine off only once.

The nature of the tone signal 105 is not critical. Thus, any frequency or amplitude can be used. A coded signal can also be used but should not be necessary. The only requirement is that sufficient voltage appears at the output of detector 32, as described above.

For the table of values shown above, detector 20 should provide at its output, initially, (before trigger delay 36 comes into effect) 5 volts. Detector 32, on the occurrence of a tone, should provide 12 volts. The detector voltage levels can be varied to suit particular component variations. However, they were found suitable with the circuit shown in FIG. 2 where the components had values shown in the table above.

The embodiment described above can be slightly modified to permit the traveler to deviate from the predetermined route without losing the benefits described above. To accomplish this new mode of operation, each signal or code 105, 105', etc., is separate and distinct from all the others on the tape 100. After each passage is completed, the appearance of any of the signals 105, 105', etc., instead of causing the machine to stop operation as described above, causes the voltage on line 97 to activate means to rewind the entire tape 100 to its beginning (not shown). Upon reception of a signal 13, now distinctly coded by everyone of the separate transmitters 10, a voltage, such as that appearing from detector 20, causes the tape 100 to sweep rapidly past all strips 104 until the code or tone on strip 104 matches that carried by signal 13, at such times that the matching takes place, the recorder 28 plays the passage 102 following the appropriately coded strip 104. The recorder 28 is then reset as described above.

What is claimed as new and desired to be secured by Letters Patent is:

1. Apparatus for reproducing a plurality of prerecorded messages, comprising carrier means having thereon a plurality of recorded messages and stop means associated with and arranged at the end of each recorded message, each stop means comprising a predetermined length portion of said carrier means, reproducing means cooperating with said carrier means for reproducing said messages in a predetermined sequence; initiating means cooperating with said reproducing means for initiating reproduction by the latter of successive ones of said messages in said sequence at respective time intervals between successive initiations, said time intervals being independent of one another; and terminating means cooperating with said reproducing means and said stop means for terminating the operation of said reproducing means at the end of each recorded message in said sequence, said terminating means being arranged to detect each of said portions and to terminate the operation of said reproducing means only when more than approximately one-half of the predetermined length of a respective one of said portions is detected by said terminating means.

2. Apparatus as defined in claim 1, wherein said initiating means comprises a manually actuated switch.

3. Apparatus as defined in claim 1, wherein at least a part of said initiating means is remote from said recording means, whereby said reproducing means may be initiated from a remote point.

4. Apparatus as defined in claim 1, wherein said carrier means comprises an elongated recording track, and wherein said messages are recorded on successive portions of said recording track.

5. Apparatus as defined in claim 4, wherein each stop means comprises a recorded signal recorded on a portion of said recording track following a portion on which an associated recorded message is recorded.

6. Apparatus as defined in claim 1, wherein said initiating means comprises at least one transmitter means remote from said reproducing means for transmitting trigger signals, and receiver means cooperating with said reproducing means for receiving said trigger signals and for initiating the operation of said reproducing means upon reception of said trigger signals.

7. Apparatus as defined in claim 1, wherein said initiating means comprises a plurality of spaced transmitter means defining a predetermined path, each transmitter means being arranged to transmit trigger signals, and receiver means movable along said path for successively passing each transmitter means along said path, and for receiving said trigger signals transmitted by each of said transmitter means which said receiver means passes along said path, and for initiating the operation of said reproducing means, when the latter is not reproducing a message, in response to reception of said trigger signals.

8. Apparatus as defined in claim 7, further comprising desensitizing means for detecting continued reception of trigger signals by said receiving means, subsequently to a first initiation of said reproducing means, and for preventing a second initiation of said reproducing means, after the operation of the latter has been terminated as the end of a respective message, until reception of trigger signals by said receiving means is first interrupted.

9. Apparatus as defined in claim 1, wherein said reproducing means includes terminal means through which electrical energy can be supplied to said reproducing means for commencing the operation of the latter, and wherein said initiating means includes switch means, connected to said terminal means and defining a portion of an energy conducting path with the latter, for opening and closing said path in response to the respective actions of said initiating and terminating means.

10. Apparatus for reproducing a plurality of prerecorded messages, comprising carrier means having thereon a plurality of recorded messages and stop means associated with and arranged at the end of each recorded message; reproducing means cooperating with said carrier means for reproducing said messages in a predetermined sequence; initiating means cooperating with said reproducing means for initiating reproduction by the latter of successive ones of said messages in said sequence at respective time intervals between successive initiations, said time intervals being independent of one another, said initiating means comprising a plurality of spaced transmitter means defining a predetermined path, each transmitter means being arranged to transmit trigger signals, and receiver means movable along said path for successively passing each transmitter means along said path and for receiving said trigger signals transmitted by each of said transmitter means which said receiver means passes along said path, and for initiating the operation of said reproducing means, when the latter is not reproducing a message, in response to reception of said trigger signals; and terminating means cooperating with said reproducing means and said stop means for terminating the operation of said reproducing means at the end of each recorded message in said sequence.

11. Apparatus as defined in claim 10, further comprising desensitizing means for detecting continued reception of trigger signals by said receiving means, subsequently to a first initiation of said reproducing means, and for preventing a second initiation of said reproducing means, after the operation of the latter has been terminated at the end of a respective message, until reception of trigger signals by said receiving means is first interrupted.

* * * * *